United States Patent
Burström et al.

(10) Patent No.: US 9,832,780 B2
(45) Date of Patent: Nov. 28, 2017

(54) METHOD FOR ESTIMATING UPLINK CONTROL CHANNEL QUALITY

(75) Inventors: Per Burström, Luleå (SE); Aare Mällo, Göteborg (SE); Henrik Sahlin, Mölnlycke (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1350 days.

(21) Appl. No.: 13/133,584

(22) PCT Filed: Dec. 9, 2008

(86) PCT No.: PCT/SE2008/051428
§ 371 (c)(1),
(2), (4) Date: Jun. 8, 2011

(87) PCT Pub. No.: WO2010/068153
PCT Pub. Date: Jun. 17, 2010

(65) Prior Publication Data
US 2011/0244905 A1    Oct. 6, 2011

(51) Int. Cl.
H04B 17/00    (2015.01)
H04W 72/08    (2009.01)
H04L 1/20    (2006.01)
H04W 52/32    (2009.01)
H04L 1/00    (2006.01)
H04W 52/14    (2009.01)

(52) U.S. Cl.
CPC ............ *H04W 72/085* (2013.01); *H04L 1/20* (2013.01); *H04W 52/325* (2013.01); *H04L 1/0026* (2013.01); *H04L 1/0036* (2013.01); *H04W 52/146* (2013.01)

(58) Field of Classification Search
CPC .......... H04L 1/20; H04W 72/08; H04W 52/32
USPC .......................... 455/67.11, 515, 452.2, 522
See application file for complete search history.

(56) References Cited

U.S. PATENT DOCUMENTS

| | | | |
|---|---|---|---|
| 2003/0099306 A1* | 5/2003 | Nilsson et al. | 375/316 |
| 2007/0121554 A1 | 5/2007 | Luo et al. | |
| 2007/0274343 A1* | 11/2007 | Nishio | 370/479 |
| 2008/0108367 A1* | 5/2008 | Afrashteh et al. | 455/452.2 |
| 2009/0067391 A1* | 3/2009 | Shen et al. | 370/336 |
| 2009/0150738 A1* | 6/2009 | Nishio et al. | 714/749 |

(Continued)

FOREIGN PATENT DOCUMENTS

| | | |
|---|---|---|
| EP | 1207629 A2 | 5/2002 |
| EP | 1207714 A1 | 5/2002 |
| EP | 1467500 A2 | 10/2004 |

*Primary Examiner* — Xin Jia
(74) *Attorney, Agent, or Firm* — Coats & Bennett, PLLC

(57) ABSTRACT

According to embodiment of the present invention, there is provided a radio base station (20) and a corresponding method for estimating the quality of the uplink control channel. The method comprises measuring (32, 42) a quality parameter of the uplink data channel, and using (38, 50) this to estimate the quality of the uplink control channel. In one embodiment, measurements of the uplink control channel are taken and their reliability determined. If the reliability is low (i.e. below a threshold, or below the respective measurements taken on the uplink data channel), then measurements on the data channel are used instead of those made on the control channel to estimate the control channel quality.

25 Claims, 3 Drawing Sheets

(56) References Cited

U.S. PATENT DOCUMENTS

2009/0196333 A1* 8/2009 Cozzo .......................... 375/225
2010/0048236 A1* 2/2010 Higuchi et al. ............... 455/522

* cited by examiner

METHOD FOR ESTIMATING UPLINK CONTROL CHANNEL QUALITY

TECHNICAL FIELD

The present invention relates to telecommunications, and more particularly relates to a method and a radio base station for estimating channel quality in a telecommunications network.

BACKGROUND

FIG. 1 shows part of a telecommunications network 10. The network 10 comprises a radio base station 12 (also known as a NodeB or an ENodeB) and a core network 14 which communicates with the radio base station 12. The radio base station 12 further communicates with a mobile terminal 16 (also known as a user equipment). In so-called uplink transmissions, data and control messages are transmitted from the mobile terminal 16 to the radio base station 12. In so-called downlink transmissions, data and control messages are transmitted from the radio base station 12 to the mobile terminal 16.

Various telecommunications standards exist to define communications within the network 10. An important part of such standards is the control of the transmission power for uplink transmissions.

In wideband code-division multiple access (WCDMA), fast uplink power control is based on measurements of the dedicated physical control channel (DPCCH) transmitted by the mobile terminal to the radio base station. Here, DPCCH pilot symbols are used by the radio base station, and transmission power control (TPC) commands are sent to the mobile terminal to adjust the transmission power of the mobile terminal based on the measured quality of those pilot symbols, e.g. the signal to interference and noise ratio (SINR). The power levels of other channels transmitted from the same mobile terminal are controlled using beta-factors defining fixed power offsets relative to the DPCCH. The DPCCH pilot symbols are sent continuously—or in the case of continuous packet connectivity (CPC), semi-continuously and rather frequently—by the mobile terminal, enabling good measurement quality. Further, the other channels (such as the dedicated physical data channel, or DPDCH) are transmitted on the same frequency of 5 MHz, such that a fixed offset is feasible. The DPCCH and DPCCH are mapped to orthogonal channelization codes (such as I and Q branches).

As shown in FIG. 1, in the long term evolution (LTE) standard (i.e. E-UTRAN as defined in Release 8 of the 3GPP specifications), two uplink channels are the physical uplink control channel (PUCCH), i.e. a control channel, and the physical uplink shared channel (PUSCH), i.e. a data channel. The transmit powers of these channels are controlled individually for each mobile terminal. This is necessary as the channels are allocated to different parts of the frequency bands and therefore have different inter-cell interference situations. Furthermore, PUSCH is multi-user orthogonal with frequency division multiplexing while PUCCH is code-divided, resulting in a loss in performance due to intra-cell interference. This intra-cell interference occurs due to non-orthogonality between codes in multi-path radio channels. It is thus very important to have an accurate power control on PUCCH when several mobile terminals transmit over the PUCCH simultaneously.

Control information is sent on PUCCH, such as HARQ ACK/NACK messages, channel state information (CSI) messages and scheduling requests. When the mobile terminal is scheduled PUSCH resources, this control information is sent on PUSCH. In Release 8 of the standard, a mobile terminal does not transmit PUCCH and PUSCH simultaneously.

The transmit powers of the PUCCH and the PUSCH are controlled by sending transmission power control (TPC) commands along with downlink transmissions. The TPC commands may, for example, be sent on the physical downlink control channel (PDCCH), see 3GPP TS 36.213. The PUCCH is transmitted within one resource block in two slots of a sub-frame, with one slot in each end of the frequency band achieving frequency diversity. The same power is applied on both PUCCH slots, which means that power control cannot follow fast multipath fading.

Channel quality measurements are an important part of determining appropriate transmit powers for the PUCCH and PUSCH. Two types of uplink reference signals are known by the radio base station, and can be used for channel estimation etc.

The first, known as a demodulation reference signal, is associated with transmission of PUSCH or PUCCH by individual mobile terminals. That is, the demodulation reference signal is individually scheduled for and transmitted by a mobile terminal as part of the PUSCH or PUCCH, depending on which channel is being transmitted. The second reference signal, known as a sounding reference signal, is not associated explicitly with PUCCH or PUSCH, but covers a wider range of frequencies, including that of the PUSCH. Sounding reference signals may be transmitted from more than one mobile terminal simultaneously. The sounding reference signal is used to improve the PUSCH channel measurement, for example to get a frequency selective measure over the PUSCH part of the frequency band.

A value of the TPC adjustment to the PUCCH can be achieved by estimating the path loss of the reference signals (also known as pilots) transmitted simultaneously on the PUCCH. When the path loss is large for a mobile terminal, that mobile terminal should be allowed to increase its transmitted power such that all users have approximately the same signal strength when received at the radio base station. Also the orthogonality and interference from other cells must be compensated for to achieve high performance and allow several users to transmit at the same time on PUCCH.

The straightforward solution is to directly measure the quality (for example, the signal-to-interference-and-noise ratio, SINR) of the received transmissions on PUCCH. The power adjustment is signalled to the mobile terminal by the use of TPC. However, when the interference from other mobile terminals is large, the path loss estimates become uncertain, and consequently the TPC commands can also become uncertain. When operating with a low information bitrate, the PUCCH has a low SINR, where it is more difficult to estimate the quality. The PUSCH, which is orthogonal and operates with a high information bitrate, preferably operates with a higher SINR.

SUMMARY

According to embodiments of the present invention, there is provided a radio base station and a corresponding method for estimating the quality of the uplink control channel. The method comprises measuring a quality parameter of the uplink data channel, and using this to estimate the quality of the uplink control channel.

For example, in one embodiment, measurements of the uplink control channel are taken and their reliability determined. If the reliability is low (i.e. below a threshold, or below the respective measurements taken on the uplink data channel), then measurements on the data channel are used instead of those made on the control channel to estimate the control channel quality.

In further embodiments, the measurements made on the control channel and the data channel are weighted according to their respective reliability and combined to form a combined measurement. This combined measurement may then be used to estimate the control channel quality.

The estimate control channel quality may then be used in any number of ways. For example, the quality may be used to determine transmit power control commands, for link adaptation, or the transmission rank of MIMO communications between the mobile terminal and the radio base station.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
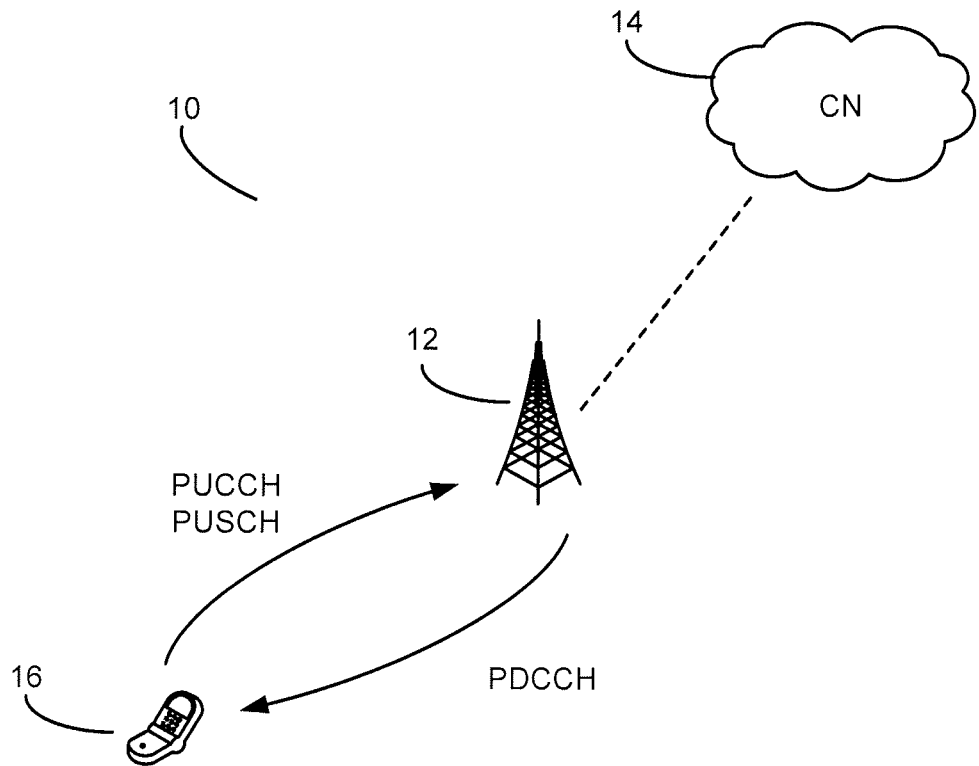
FIG. 1 illustrates a telecommunications network.
Figure 2:
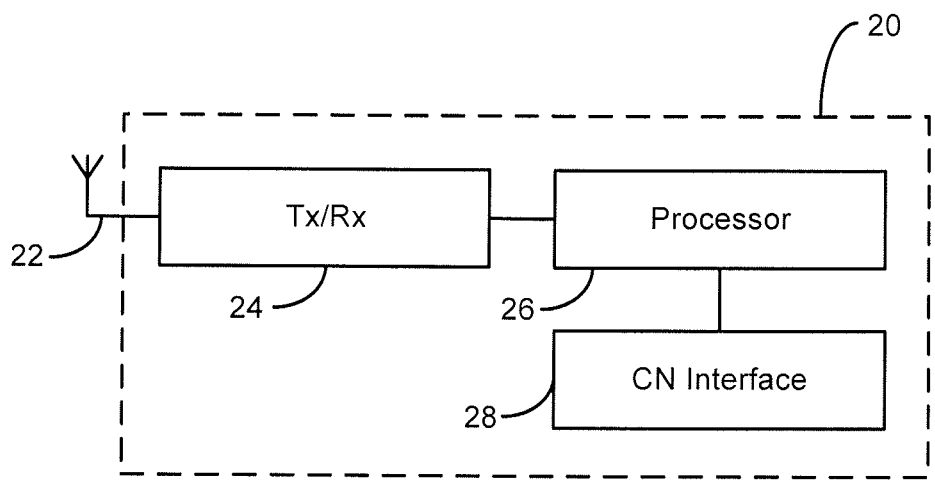
FIG. 2 shows a radio base station according to an embodiment of the present invention.

FIG. 2 illustrates a radio base station 20 (or NodeB, ENodeB, etc) according to an embodiment of the present invention. The radio base station 20 comprises an antenna 22, which is capable of receiving and transmitting signals. The antenna 22 is coupled to transmitter/receiver circuitry 24 (or, more generally, transceiver circuitry), and this is in turn connected to processing circuitry 26.

The radio base station 20 further comprises core network interface circuitry 28 for managing one or more interfaces with the core network.

In operation, the antenna 22 receives signals transmitted by a mobile terminal (or user equipment, etc), and the processor 26 measures those signals as will be described in greater detail below.

It will be apparent to those skilled in the art that, where they are non-essential for a description of the embodiments of the present invention, numerous features have been omitted from the description of the radio base station 20 for clarity. Moreover, it will also be clear that alternative configurations than that illustrated are possible. For example, the radio base station 20 may comprise a plurality of antennas, with each connected to respective Tx/Rx circuitry, or connected to single Tx/Rx circuitry.

As described above, the radio base station 20 receives signals from a mobile terminal over a plurality of different uplink channels, generally including a control channel and a data channel. For example, in E-UTRA as defined by Release 8 of the 3GPP specifications, the radio base station 20 receives signals over the PUCCH (i.e. a control channel) and the PUSCH (i.e. a data channel); however, the embodiments of the present invention are applicable to any telecommunications standard in which uplink signals are transmitted over a control channel and a data channel.

Demodulation reference signals are received over the uplink control channel and the uplink data channel, as described above. In addition, the radio base station 20 receives sounding reference signals from the mobile terminal over the part of the frequency band on which the uplink data channel is transmitted.

According to embodiments of the present invention, channel quality measurements are performed, at least in part, over the part of the frequency band on which the uplink data channel (e.g. PUSCH) is transmitted. That is, an uplink signal is received over the data channel at the antenna 22, demodulated by Tx/RX circuitry 24, and measured by processing circuitry 26 to determine a channel quality parameter such as the signal strength, the path loss, or any one of further examples given below. This measured data channel quality parameter may then be used to estimate the channel quality of the uplink control channel (e.g. PUCCH). In one embodiment, the measurements are made on demodulation reference symbols transmitted over the uplink data channel; in another embodiment, the measurements are made on a sounding reference signal transmitted at least in part over the frequency on which the uplink data channel is transmitted. Future references to measurements on the uplink data channel, for example, are taken to mean measurements made on the part of the frequency band on which the uplink data channel is transmitted. Future references to measurements on the uplink control channel, for example, are taken to mean measurements made on the part of the frequency band on which the uplink control channel is transmitted.

The radio base station 20 may also perform such measurements on the uplink control channel. If the control channel measurements are unreliable for some reason (e.g. control channel pilots are too intermittent, or their quality is too poor), the data channel measurements may be used instead of, or in combination with the control channel measurements to estimate the channel quality of the uplink control channel.

In this way, even if transmissions on the control channel are intermittent or unreliable, a reliable determination of its quality may still be obtained.

Figure 3:
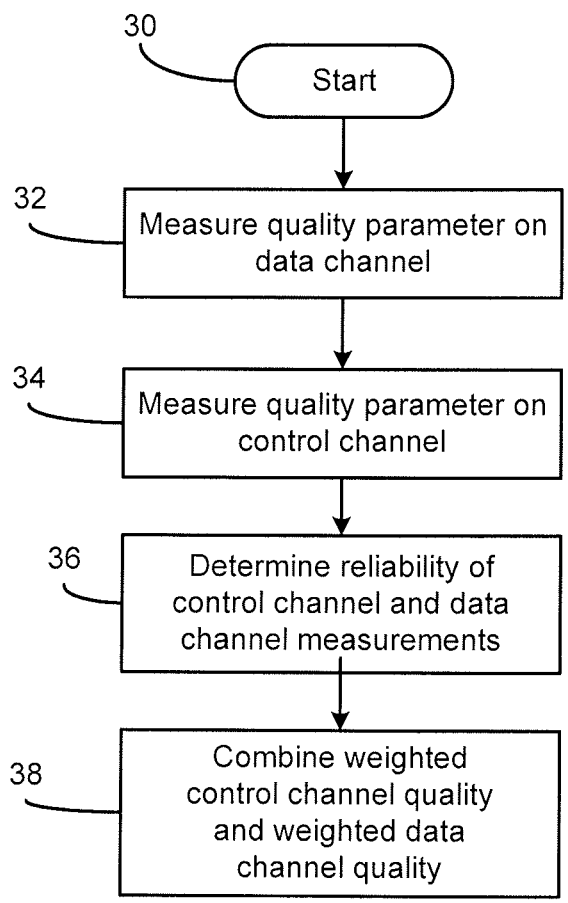
FIG. 3 is a flowchart illustrating a method according to and embodiment of the present invention.

FIG. 3 is a flow chart illustrating a method according to an embodiment of the present invention.

The method begins in step 30.

In step 32, the radio base station measures the quality of the uplink data channel. That is, when the mobile station of interest is transmitting to the radio base station over the uplink data channel, the radio base stations measures a channel quality parameter. The channel quality parameter may be measured on a demodulation reference signal or a sounding reference signal, as described above. This parameter may be any one of: the signal strength; the delay spread; the path loss; the Doppler spread; the frequency error; the noise strength; the interference strength; the channel precoding matrix; the channel rank; and the signal to interference and noise ratio.

If multiple-input, multiple-output (MIMO) is used for transmission of the control channel, i.e. support of multiple streams from a mobile terminal, then pre-coding matrices can be decided by the base station, signalled to the mobile terminal and used when transmitting the control channel. In this case, the base station can estimate a pre-coding matrix "quality parameter" based on the reference signals. In addition, the transmission rank of the MIMO uplink communications (i.e. the number of separate data streams to be transmitted over the MIMO radio link) may be decided by the base station and signalled to the mobile terminal.

If a link adaptation is used for the control channel then channel coding rate, modulation and use of MIMO transmissions for the control channel is changed depending on radio channel quality. In this case, the base station can estimate a link adaptation "control channel quality parameter" based on the reference signals.

In E-UTRAN as specified in Release 8 and later releases of the 3GPP specifications, the uplink data channel is a shared channel, and therefore measurements must be performed when the mobile station is scheduled on the data channel (PUSCH).

In step 34, the radio base station performs similar measurements of a channel quality parameter on the uplink control channel (e.g. PUCCH). That is, when the mobile station of interest is transmitting to the radio base station over the uplink control channel, the radio base station measures any of the following: the signal strength; the delay spread; the path loss; the Doppler spread; the frequency error; the noise strength; the interference strength; the channel precoding matrix; the transmission rank; and the signal to interference and noise ratio.

The radio base station may additionally determine certain uplink control channel quality parameters as cell average values. For example, the uplink inter-cell interference level on the uplink control channel $I_{CONTROL}$ may be estimated based on the total received power on the uplink control channel and the signal strength of all individually received transmissions for each time slot. The orthogonality (intra-cell interference) of the uplink control channel $Loss_{orth}$ may be estimated by measuring the received quality of transmission from all mobile stations in the cell. The measurement of inter- and intra-cell interference may be performed in a single step, by measuring signal strength and signal to interference and noise ratio (SINR) on all control channel transmissions in the cell.

In step 36, the reliability is determined of the control channel measurements from the mobile terminal of interest, that is, the reliability of the measurements of the channel quality parameter. In one embodiment, this is determined by calculating the number of pilot symbols received over the control channel in a given period of time. In a further embodiment, the signal to noise ratio of the received reference signal symbols is used to determine the reliability of the control channel measurements. For low signal to noise ratios, the variance of the measured channel quality parameter is large, i.e. the estimate of the channel quality parameter is uncertain. In another embodiment, the variations of the signal and noise strengths are measured to determine the reliability. When these variations, measured as a variance or standard deviation, are large, then the reliability of the measurement is low. In a further embodiment, the Doppler spread can also be used as a measure of the reliability of the measurement. The Doppler spread is a measure of how fast a mobile terminal is moving within a cell, and thus a measure of how fast the signal strength is varying. When the signal strength is fast varying, each measurement is not valid during a long period, and should be considered as unreliable. In a yet further embodiment, the frequency error can be a measure of how fast a mobile terminal is moving, and how reliable a channel quality measurement is. The frequency error is due both to uncertain oscillators in the mobile terminals and to fast moving mobile terminals. A combination of any of these approaches may be used to define the reliability of the control channel.

The reliability of the measurements made on the data channel is similarly determined.

In step 38, the measured channel quality parameter of the data channel and the measured channel quality parameter of the control channel are weighted according to the reliability of the data channel measurements and the reliability of the control channel measurements, respectively, and combined to estimate the channel quality of the control channel. As an example, if relatively few reference signal symbols are received over the control channel, or their quality is poor, the control channel may be deemed to be highly unreliable. In this instance, if the measurements of the data channel are more reliable, a relatively high weight is applied to the measured data channel parameter, and a relatively low weight is applied to the measured control channel parameter. Conversely, if a high number of reference signal symbols are received over the control channel it may be deemed to be reliable. In this case, more weight is placed on the control channel parameter than the data channel parameter.

In a further example, it may be the case that the measured control channel parameter, as a default parameter for measuring control channel quality, is generally given a higher weighting than the measured data channel parameter. Thus, even if the control channel measurements are unreliable, they may still be given a greater weighting than the data channel measurements. However, even in this case, the relative weighting of the data channel measurements will still increase the more unreliable the control channel measurements become. Thus, the weighting of data channel measurements when the control channel measurements are unreliable will be higher than the weighting of data channel measurements when the control channel measurements are more reliable.

In an example where the measured channel parameters are the signal strengths of the data channel and the control channel, $S_{DATA}$ and $S_{CONTROL}$ respectively, and the desired control channel quality estimate is of the SINR, the SINR may be calculated as:

$$SINR = S_{COMBINED} - I_{CONTROL} - Loss_{orth}$$

where $S_{COMBINED}$ is a combination of $S_{DATA}$ and $S_{CONTROL}$, weighted as described above according to the reliability of the control channel measurements, and where all values are given in a logarithmic scale (such as dB values).

In an alternative example, an estimate of the individual orthogonality of a mobile terminal in comparison with other mobile terminals may be obtained by measuring delay spread as the quality parameters of the data and control channels.

Figure 4:
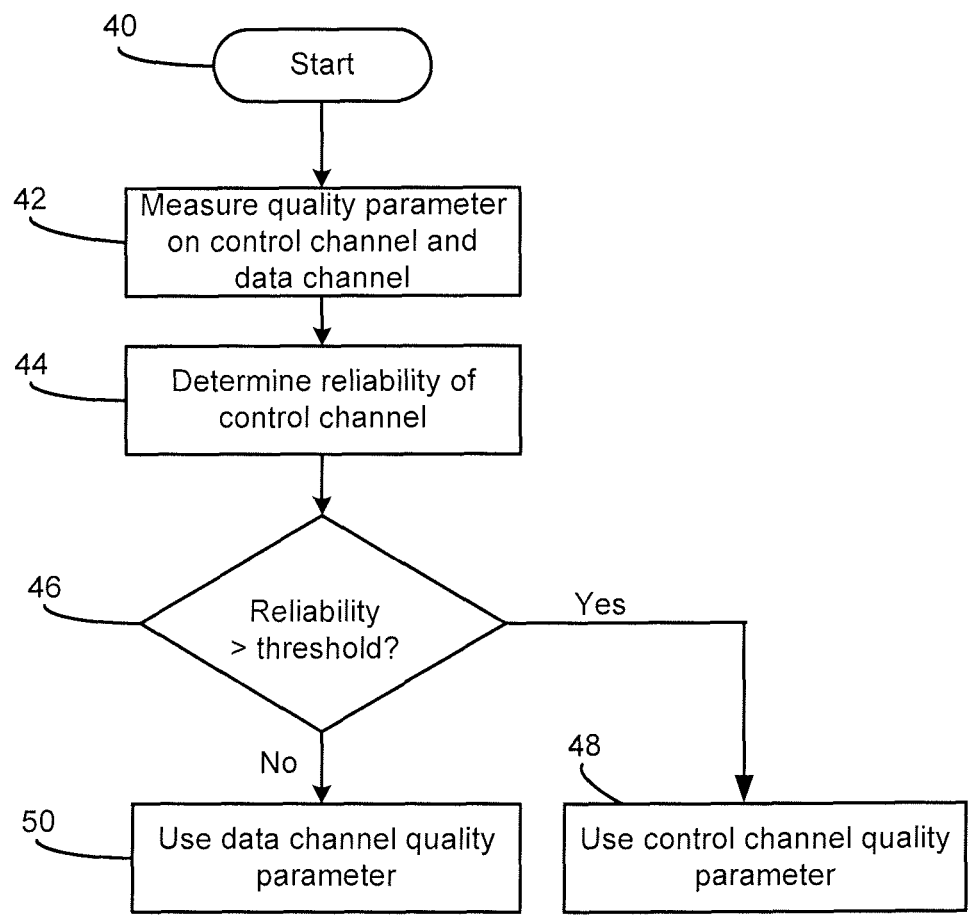
FIG. 4 is a flowchart illustrating a further method according to an embodiment of the present invention.

FIG. 4 is a flowchart illustrating a further method according to an embodiment of the present invention.

The method starts in step 40. In step 42, the radio base station measures a chosen channel quality parameter on the control channel and the data channel, and in step 44 the reliability of the control channel measurements is determined. Thus, steps 42 and 44 and similar to steps 32, 34 and 36 described with respect to FIG. 3, and they will not be described further herein.

In step 46, the determined reliability of the control channel measurements is compared with a threshold. For example, where the reliability is determined based on a number of received pilot symbols (i.e. reference signals) in a given period of time, the threshold may be a number of pilot symbols. Similarly, different thresholds may be defined for each reliability measure.

If the reliability is above the threshold, the control channel measurements are deemed reliable and the method proceeds to step 48, where the control channel measurements are used to estimate the quality of the control channel.

If the reliability is below the threshold, the control channel measurements are deemed unreliable and the method proceeds to step 50, where the data channel measurements are used to estimate the quality of the control channel. That is, where a measured control channel parameter would be used to calculate the control channel quality, the measured data channel parameter is used instead, or is used to derive the control channel parameter, which in turn may be used to calculate the control channel quality.

Thus, the method described with respect to FIG. 4 is similar to that described with respect to FIG. 3. However, instead of combining measurements, either measurements from the data channel or measurements from the control channel are used, depending on the reliability of the control channel measurements.

Thus, in the example given above, where the SINR of the control channel is desired, and the measured parameter is the data channel signal strength, a modified control channel signal strength $S^*_{CONTROL}$ is derived from the measured data channel signal strength $S_{DATA}$ according to:

$$S^*_{CONTROL} = S_{DATA} + B_{CONTROL} - B_{DATA},$$

where $B_{CONTROL}$ is the amplitude scaling factor for the data channel, see 3GPP TS 36.211 (also known as the beta factor for the control channel) and $B_{DATA}$ is the amplitude scaling factor for the data channel (also known as the beta factor for the data channel), all values given in a logarithmic scale. This modified control channel signal strength $S^*_{CONTROL}$ may then be used to derive the SINR as follows:

$$SINR = S^*_{CONTROL} - I_{CONTROL} - Loss_{orth}$$

Once derived, according to any of the methods described above, the channel quality estimate may be used in a number of different ways in the telecommunications network, as will be clear to those skilled in the art. For example, the channel quality estimate may be used in transmit power control of the mobile terminal. That is, if the channel quality estimate derived above is below a desired target, a TPC command may be sent to the mobile terminal such that the mobile terminal can increase or decrease its transmit power. The channel quality estimate may be used to select a suitable precoding matrix in multi-input, multi-output (MIMO) transmissions. The channel quality estimate may also be used in link adaptation, i.e. selecting code rate, modulation and use of MIMO.

There is thus disclosed a method and a radio base station for estimating the quality of an uplink control channel transmitted between a mobile terminal and the radio base station. The method comprises measuring the quality of an uplink data channel, and using that measured quality to estimate the quality of the uplink control channel. In this way, embodiments of the present invention do not rely on measurements of the uplink control channel that may be old or otherwise unreliable.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope. The order in which steps of a method are presented is not necessarily the only order in which they may be performed. For example, in FIG. 3, the control channel may be measured before the data channel without substantially affecting operation of the invention.

The invention claimed is:

1. A method of estimating a quality of an uplink control channel in a telecommunications network, the telecommunications network comprising at least a mobile terminal and a radio base station, the mobile terminal transmitting to the radio base station over a first part of a frequency band for the uplink control channel and over a second part of the frequency band for an uplink data channel, wherein the uplink control channel and the uplink data channel are different channels for transmission over separate parts of the frequency band, the method comprising:
    measuring a quality parameter for the second part of the frequency band; and
    using said measured quality parameter for the second part of the frequency band to estimate the quality of the uplink control channel.

2. The method of claim 1, further comprising:
    measuring a quality parameter for the first part of the frequency band;
    determining a reliability of the measurement of the quality parameter for the first part of the frequency band; and
    if said reliability is below a threshold, using said measured quality parameter for the second part of the frequency band to estimate the quality of the uplink control channel.

3. The method of claim 2, wherein said reliability is based on one or more of: a number of reference signal symbols received in a period of time on the first part of the frequency band; a signal to noise ratio of reference signal symbols received on the first part of the frequency band; signal to noise variation of reference signal symbols received on the first part of the frequency band; Doppler spread of reference signal symbols received on the first part of the frequency band; and frequency error of reference signal symbols received on the first part of the frequency band.

4. The method of claim 1, wherein said measured quality parameter for the second part of the frequency band is one of: a signal strength; a delay spread;
    a path loss; a Doppler spread; a frequency error; a noise strength; an interference strength; a channel pre-coding matrix; a transmission rank; and a signal to interference and noise ratio.

5. The method of claim 1, further comprising:
    measuring a quality parameter for the first part of the frequency band; and
    combining said measured quality parameter for the first part of the frequency band with said measured quality parameter for the second part of the frequency band to estimate the quality of the uplink control channel.

6. The method of claim 5, wherein said measured quality parameter for the first part of the frequency band is one of: a signal strength; a delay spread; a path loss; a Doppler spread; a frequency error; a noise strength; an interference strength; a channel pre-coding matrix; a transmission rank; and a signal to interference and noise ratio.

7. The method of claim 5, wherein said combining comprises:
    weighting said measured quality parameter for the second part of the frequency band according to a reliability of the measurement of that quality parameter;
    weighting said measured quality parameter for the first part of the frequency band according to a reliability of that quality parameter;
    combining said weighted measured quality parameter for the first part of the frequency band with said weighted measured quality parameter for the second part of the frequency to estimate the quality of the uplink control channel.

8. The method of claim 7, wherein said reliabilities of the measured quality parameters for the first and second parts of the frequency band are based on one or more of: a number of reference signal symbols received in a period of time on the respective parts of the frequency band; a signal to noise ratio of reference signal symbols received on the respective parts of the frequency band; signal to noise variation of reference signal symbols received on the respective parts of the frequency band; Doppler spread of reference signal symbols received on the respective parts of the frequency band; and frequency error of reference signal symbols received on the respective parts of the frequency band.

9. The method of claim 1, wherein the quality of the uplink control channel is a signal to interference and noise ratio (SINR), or an orthogonality between reference signal symbols transmitted on the uplink control channel.

10. The method of claim 1, further comprising:
deriving an uplink transmit power adjustment from said estimated quality of the uplink control channel; and
signalling said uplink transmit power adjustment to the mobile terminal.

11. The method of claim 1, further comprising:
deriving an uplink transmission format from said estimated quality of the uplink control channel; and
signalling said uplink transmission format to the mobile terminal.

12. The method of claim 1, further comprising:
deriving an uplink transmission rank from said estimated quality of the uplink control channel; and
signalling said uplink transmission rank to the mobile terminal.

13. The method of claim 1, further comprising:
signalling said estimated quality of the uplink control channel to the mobile terminal.

14. The method of claim 1, wherein the uplink data channel is a physical uplink shared channel (PUSCH).

15. The method of claim 10, wherein the uplink control channel is a physical uplink control channel (PUCCH).

16. The method of claim 1, wherein said telecommunications network is an evolved universal transport radio network (E-UTRAN).

17. The method of claim 1, wherein only one of said uplink control channel and said uplink data channel is transmitted at a time.

18. A radio base station for use in a telecommunications network, the telecommunications network further comprising at least a mobile terminal configured to transmit to the radio base station an uplink control channel over a first part of a frequency band and an uplink data channel over a second part of the frequency band, wherein the uplink control channel and the uplink data channel are different channels for transmission over separate parts of the frequency band, the radio base station comprising:

a transceiver for receiving transmissions from the mobile terminal; and
a processor configured to measure a quality parameter for the transmissions received over the second part of the frequency band and to use said measured quality parameter for the second part of the frequency band to estimate the quality of the uplink control channel.

19. The radio base station of claim 18, wherein the processor is further configured to measure a quality parameter for transmissions received over the first part of the frequency band; determine a reliability of the measurement of the quality parameter for the first part of the frequency band; and, if said reliability is below a threshold, use said measured quality parameter for the second part of the frequency band to estimate the quality of the uplink control channel.

20. The radio base station of claim 18, wherein the processor is further configured to measure a quality parameter for the first part of the frequency band and to combine said measured quality parameter for the first part of the frequency band with said measured quality parameter for the second part of the frequency band to estimate the quality of the uplink control channel.

21. The radio base station of claim 20, wherein the processor is configured to weight said measured quality parameter for the second part of the frequency band according to a reliability of the measurement of that quality parameter; weight said measured quality parameter for the first part of the frequency band according to a reliability of the measurement of that quality parameter; and combine said weighted measured quality parameter for the first part of the frequency band with said weighted measured quality parameter for the second part of the frequency to estimate the quality of the uplink control channel.

22. The radio base station of claim 18, wherein the processor is further configured to derive an uplink transmit power adjustment from said estimated quality of the uplink control channel, and wherein the transceiver is configured to signal said uplink transmit power adjustment to the mobile terminal.

23. The radio base station of claim 18, wherein the processor is further configured to derive an uplink transmission format from said estimated quality of the uplink control channel, and wherein the transceiver is configured to signal said uplink transmission format to the mobile terminal.

24. The radio base station of claim 18, wherein the processor is further configured to derive an uplink transmission rank from said estimated quality of the uplink control channel, and wherein the transceiver is configured to signal said uplink transmission rank to the mobile terminal.

25. The radio base station of claim 18, wherein the transceiver is further configured to signal said estimated quality of the uplink control channel to the mobile terminal.

* * * * *